Patented Dec. 9, 1930

1,784,070

UNITED STATES PATENT OFFICE

EFFIE H. MOSS, OF CHILLICOTHE, OHIO

SOFT RUBBERLIKE COMPOSITION

No Drawing.   Application filed January 10, 1927.   Serial No. 160,312.

The present invention is directed to an artificial rubber-like composition.

The object of the invention is to produce a composition including such ingredients that when properly mixed and proportioned, will produce a composition having the characteristics of soft rubber.

The composition is produced by mixing:

| | | |
|---|---|---|
| Linseed oil | 2 | teaspoons |
| Lime | 1 | teaspoon |
| Water | 1½ | ounces |
| Isinglass | 1 | teaspoon |
| Soap solution | 1 | teaspoon |
| Tincture of benzoin | 5 | drops |
| Rendered grease | ¼ | teaspoon |
| Mercury | 1 | drop |

In preparing the composition the linseed oil, lime and tincture of benzoin are first stirred in a suitable cooking vessel, the water, isinglass and soap solution being then added and stirred thoroughly. The mass thus obtained is cooked in the vessel over a moderately hot burner until the proper consistency has been obtained, after which the vessel is removed from the burner and the grease and mercury stirred into the mass. After the grease and mercury have been added the mass is thoroughly mixed and can then be poured into suitable molds.

The admixture of the linseed oil will soften the lime while the soap solution will add the proper smoothness to the mass, the mercury maintaining the composition sufficiently soft to serve as a substitution for soft rubber. It is desirable that the isinglass be dissolved in soft or hard water and the liquid thus obtained added to the other ingredients at the proper time. Obviously, the constituents, oil and grease, serve as a moisture repellant.

The composition made in accordance with my invention will possess the characteristics of soft rubber, being thoroughly elastic and moisture repellant. The elastic dough resembling initially soft rubber is in some cases found to lose practically all of its malleability during the aging or oxidation. Its use as a sealing compound when the initial elasticity becomes impaired, is obvious since the initial spongyness of the mass will permit of its being readily worked into joints and its subsequent hardening will seal such connections as will be easily understood.

Having thus described the invention, what I claim is:

A rubber-like composition comprising linseed oil, lime, water, isinglass, soap solution, tincture of benzoin, grease, and mercury, in about the proportions of linseed oil two teaspoons; lime one teaspoon; water one and one-half ounces; isinglass one teaspoon; soap solution one teaspoon; tincture of benzoin five drops; grease one-quarter teaspoon, and mercury one drop.

In testimony whereof I affix my signature.

EFFIE H. MOSS. [L. S.]